July 17, 1951     R. W. FREEMAN     2,560,565
COMBINED HOSE CONNECTOR AND CLAMP
Filed May 24, 1950
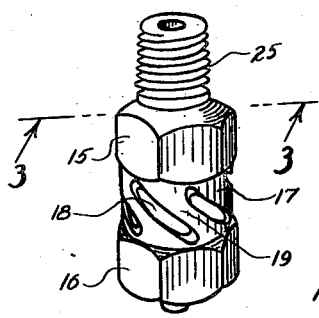
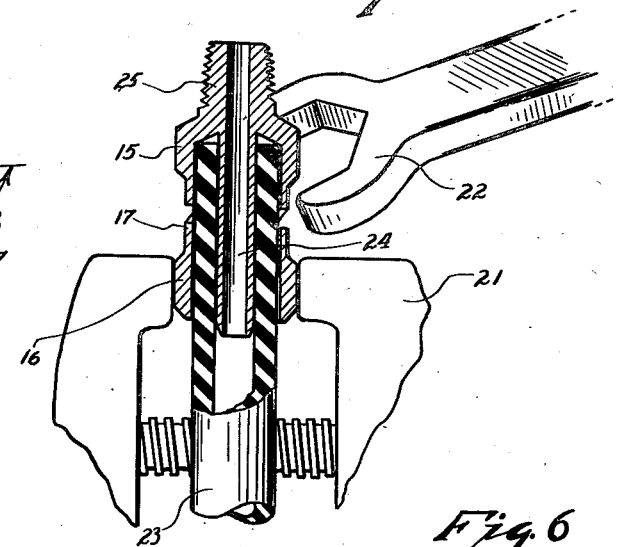
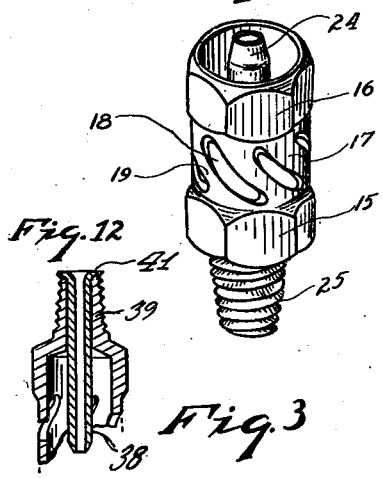
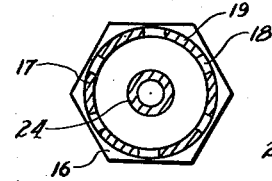
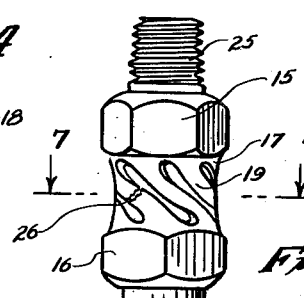
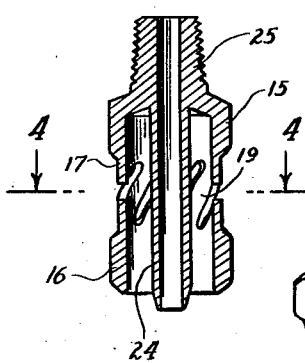
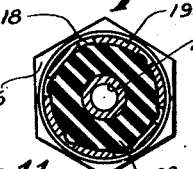
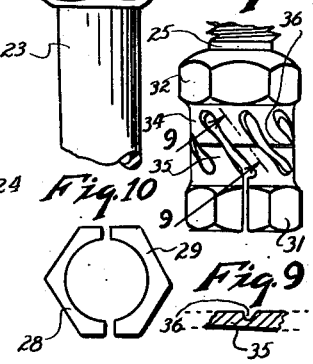
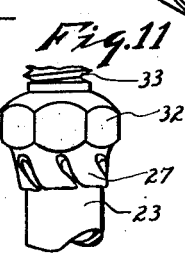
INVENTOR.
ROBERT W. FREEMAN
BY
L. S. Saulsbury
ATTORNEY Patented July 17, 1951

2,560,565

UNITED STATES PATENT OFFICE 2,560,565

COMBINED HOSE CONNECTOR AND CLAMP

Robert W. Freeman, Purchase, N. Y., assignor of one-half to Laforest S. Saulsbury, New York, N. Y.

Application May 24, 1950, Serial No. 163,933

6 Claims. (Cl. 285—84)

1

This invention relates to a unitary hose fitting and clamp.

It is an object of the present invention to provide a hose fitting means adapted to be adjusted to clamp and secure the fitting upon the hose and without the need for a separate clamp or a special machine with which to secure the fitting to the hose and where the securement of the fitting upon the hose can be done in the field with a vise and wrench.

Other objects of the present invention are to provide a unitary hose fitting and clamp which is of simple construction, inexpensive to manufacture, formed on a machine screw lathe, suitable for high pressure hose, safe, durable, easily secured upon the hose, made from standard machine stock, and efficient in operation.

For other objects and for a better understanding of the invention, reference may be had to the following detailed description taken in connection with the accompanying drawing, in which:

Fig. 1 is a perspective view of the unitary fitting and clamp embodying the features of the present invention and looking down upon the threaded securing end.

Fig. 2 is a perspective view of the fitting and clamp looking down into the flexible hose entering end.

Fig. 3 is a vertical sectional view taken on line 3—3 of Fig. 1.

Fig. 4 is a transverse sectional view taken on line 4—4 of Fig. 3.

Fig. 5 is a vertical sectional view of the unitary fitting and clamp in the process of being secured upon a flexible rubber hose with the fitting being held between vise jaws and a wrench about to be secured upon the fitting to turn the same and to distort intervening weakened portions of the fitting.

Fig. 6 is a side elevational view of the hose connector and clamp after the weakened sections have been collapsed to grip the hose.

Fig. 7 is a transverse sectional view taken on line 7—7 of Fig. 6.

Fig. 8 is an elevational view of a modified form of the invention wherein portions of the clamp part, after they have been used to shrink the clamping fingers, are removed.

Fig. 9 is a fragmentary sectional view taken on line 9—9 of Fig. 8.

Fig. 10 is a bottom plan view of the form of the invention shown in Fig. 8.

Fig. 11 is an elevational view of the hose fitting

2 after the fingers have been drawn about the hose and the twisting portions removed.

Referring now particularly to Figs. 1 to 7, 15 and 16 represent hexagonal formations adapted to receive wrenches or to be fitted into a vise and connected together by a weakened portion 17 having a series of parallel inclined slots extending thereabout whereby to provide a group of bar sections 19 that will be bendable as the hexagonal portions 15 and 16 are turned in opposite directions or while one of the portions is held in the vise, as shown in Fig. 5 at 21, and the other portion is turned with a wrench 22 to collapse the bendable bar sections into the slots in the manner illustrated in Fig. 6 whereby to shrink the weakened portion 17 upon a hose 23 and to confine and grip the hose when being held over an internal nipple or tube portion 24 that has a through passage that continues through a threaded nipple portion 25 projecting from the hexagonal portion 15.

In the manufacture of the item, the same can be done on an automatic screw machine and from standard hexagonal stock. While brass material has been found satisfactory, it will be apparent that the stock can be of other material. The tubular portion 24 can be formed as an integral part of the hexagonal portion 15 or may be fitted into the same as a separate piece and soldered or welded.

The twisting of one hexagonal portion with respect to the other can be stopped upon the bar sections coming to rest upon one another or upon one bar which may be weakened more than the others being broken, as indicated at 26, Fig. 6. The break will give the indication that sufficient twisting and gripping action of the hose 23 has been effected.

Referring now particularly to Figs. 8 to 11, inclusive, there is shown a modified form of construction. It is found that if all of the bar sections are permitted to be broken that there is, in fact, sufficient gripping action of the remaining parts of the bar sections, in indicated at 27, Fig. 11, to grip the hose. These parts 27 will have been drawn inwardly and split sections 28 and 29 of a hexagonal portion 31 may be removed. The other hexagonal portion is indicated at 32 and it has a threaded nipple portion 33.

As shown in Figs. 8 and 9, there is interposed between the split hexagonal portion 31 and the hexagonal portion 32 a weakened portion 34 having bar sections 35 which are notched on their outer faces, as indicated at 36, to weaken them so that they will be separated into parts as they are brought to the final tightened position upon the hose 23. The parts 27 remain and maintain the tight engagement of the portions 32 and 33 upon the hose 23. The other parts of the bar section 35 will be removed with the split parts 28 and 29 of the split hexagonal portion 31.

In Fig. 12, there is shown a modified form of the invention wherein the tube, as indicated at 38, is connected in the end of the threaded nipple portion 39 and flared at its end, as indicated at 41, to retain it against inward displacement.

It will be apparent that the length of the spaced nut portions can be different and the spaced nut portion 16 may be preferably longer in order that a distortion of the nut will not be effected as the turning upon the nut formation results and whereby to provide adequate material in this nut formation 16.

It will be apparent that there has been provided a combined hose fitting and clamp that is formed of a unitary structure and which can be connected to the hose by the mere manipulation of two wrenches or of a vise and a single wrench. With the hose put in place upon the tubular portion 29, the hexagonal or nut portions are adjusted to effect the collapse of the bar sections 19.

While various changes may be made in the detail construction, it shall be understood that such changes shall be within the spirit and scope of the present invention as defined by the appended claims.

I claim:

1. A combined hose connector and clamp comprising spaced portions adapted to be gripped with a tool, a weakened portion extending between the spaced portions and having a plurality of inclined weakened bar sections adapted to be collapsed as the spaced portions are turned relative to each other, said spaced and weakened portions being hollow to receive a hose whereby as the spaced portions are adjusted the bar sections of the weakened portion may grip the hose.

2. A combined hose connector and clamp comprising spaced portions adapted to be gripped with a tool, a weakened portion extending between the spaced portions and having a plurality of inclined weakened bar sections adapted to be collapsed as the spaced portions are turned relative to each other, said spaced and weakened portions being hollow to receive a hose whereby as the spaced portions are adjusted the bar sections of the weakened portion may grip the hose, and a tubular portion connected to one of the spaced portions and extending through the spaced and weakened portions and adapted to receive the hose, and a threaded nipple portion extending from the spaced portion which has the tubular portion.

3. A combined hose connector and clamp as defined in claim 1 and one of the inclined bar sections of the weakened portion being weakened more than the other bar section so as to be broken upon effecting the twisting action upon the weakened portion whereby to give indication that sufficient twisting action has been effected.

4. A combined hose connector and clamp as defined in claim 1 and said bar sections being weakened and adapted to be divided into parts upon the twisting action being effected and when carrying the parts into gripping relationship with the hose, and one of the spaced portions being of split formation whereby the parts thereof may be separated for removal of the hose upon the parts of the individual bar sections being separated from one another.

5. A hose connector and clamp comprising spaced nut formations interposed by a weakened portion integrally united therewith, said weakened portion having diagonally disposed bar sections surrounding the same, said spaced and weakened portions being hollow to receive a hose, said bar sections adapted to collapse and to shrink inwardly as the nut formations are twisted relative to one another whereby to grip any hose that may be disposed therewithin and hose coupling means connected to one of the spaced nut formations.

6. A tubular clamp device comprising spaced portions adapted to be gripped by a tool and an intermediate weakened portion integrally connected therebetween and having inclined spaced bar sections adapted as the spaced portions are angled relative to one another to collapse and to shrink about a body that may be disposed within the portions whereby to grip the same.

ROBERT W. FREEMAN.

No references cited.